Nov. 28, 1967  G. E. RALEY  3,354,506
APPARATUS FOR MELT EXTRUSION OF MULTI-WALL PLASTIC TUBING
Original Filed April 30, 1962  5 Sheets-Sheet 1
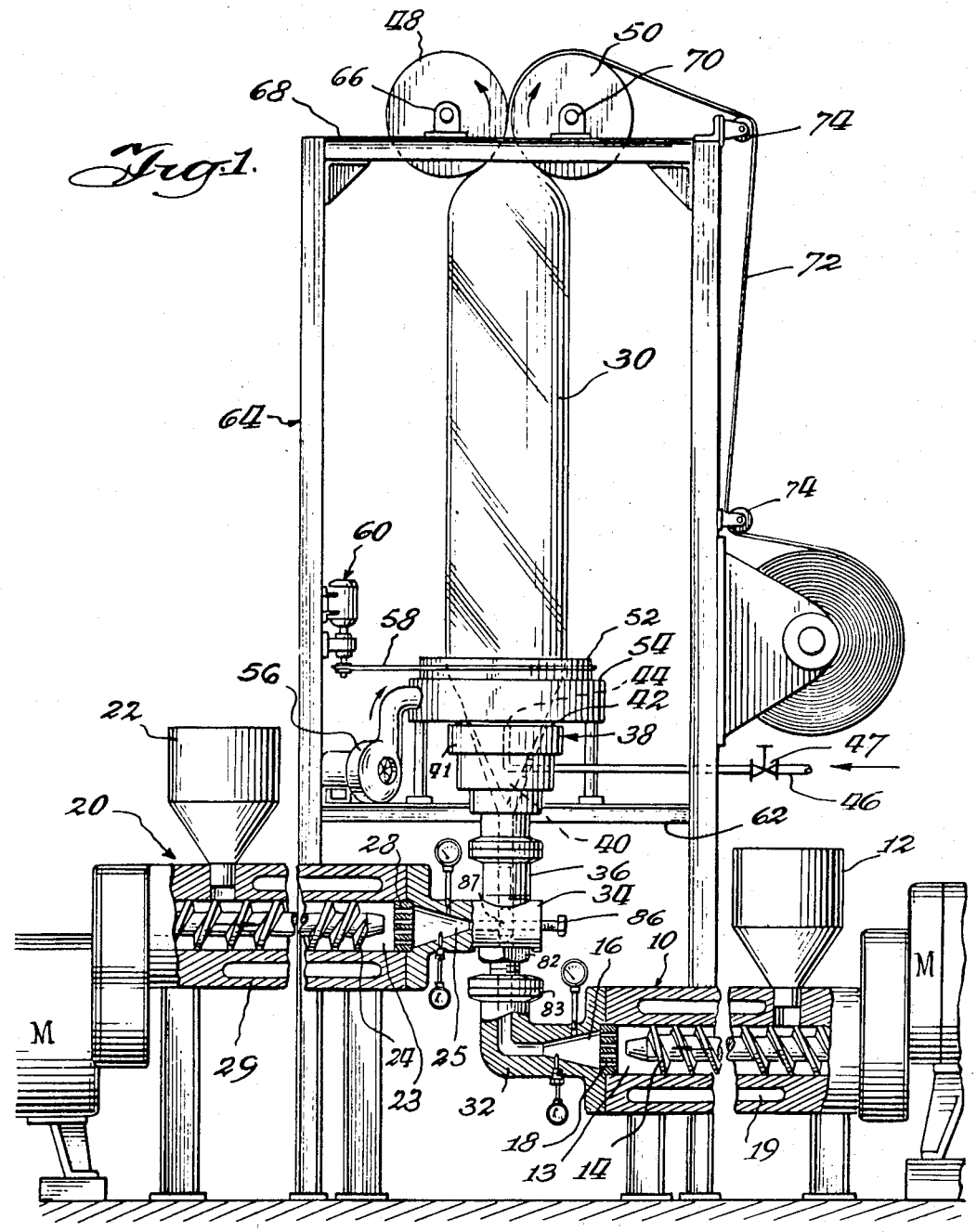
INVENTOR.
GARLAND E. RALEY
BY
ATTORNEY

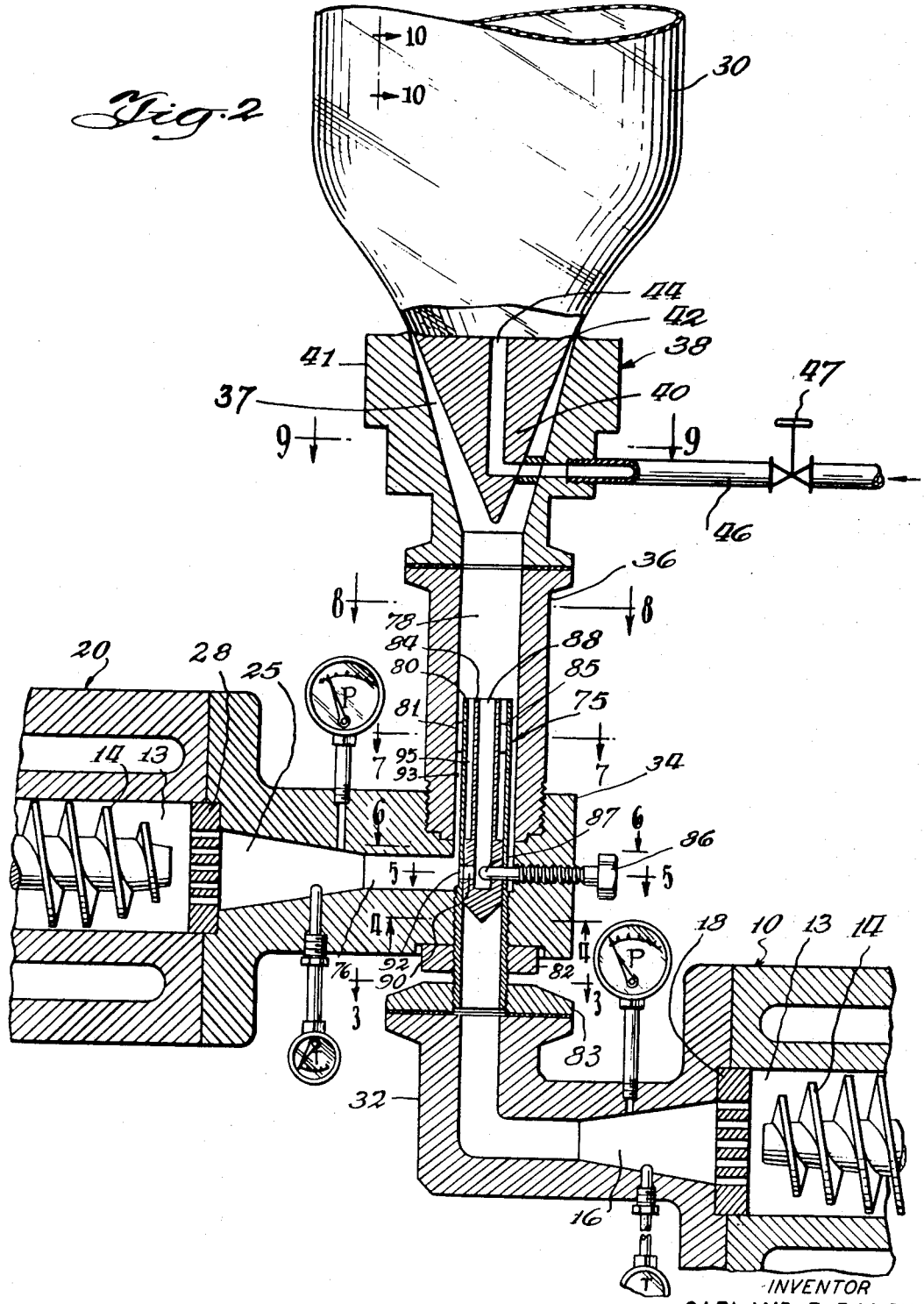

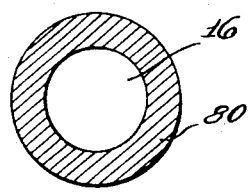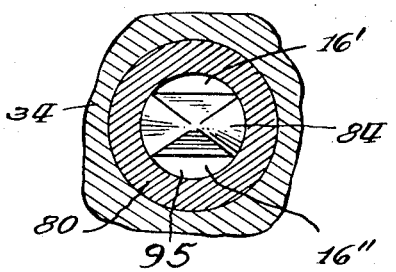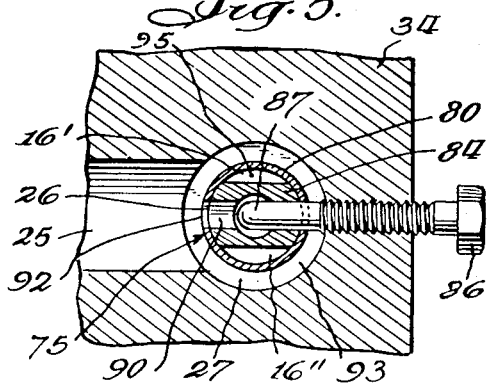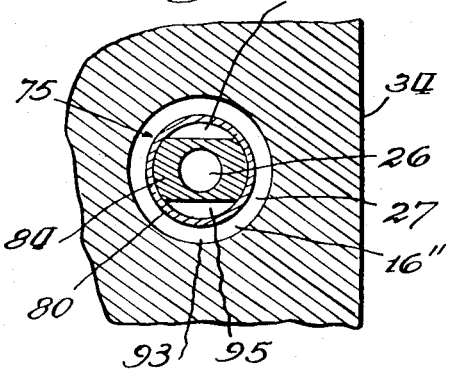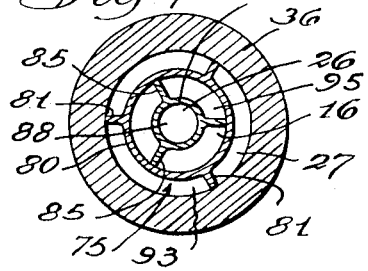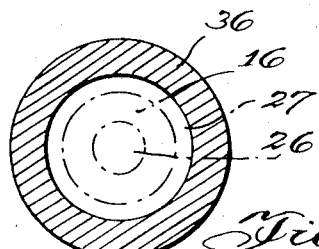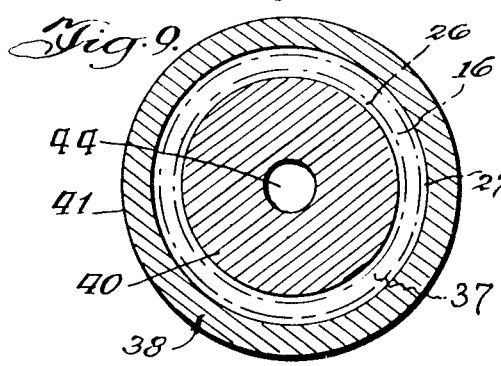
INVENTOR.
GARLAND E. RALEY
ATTORNEY

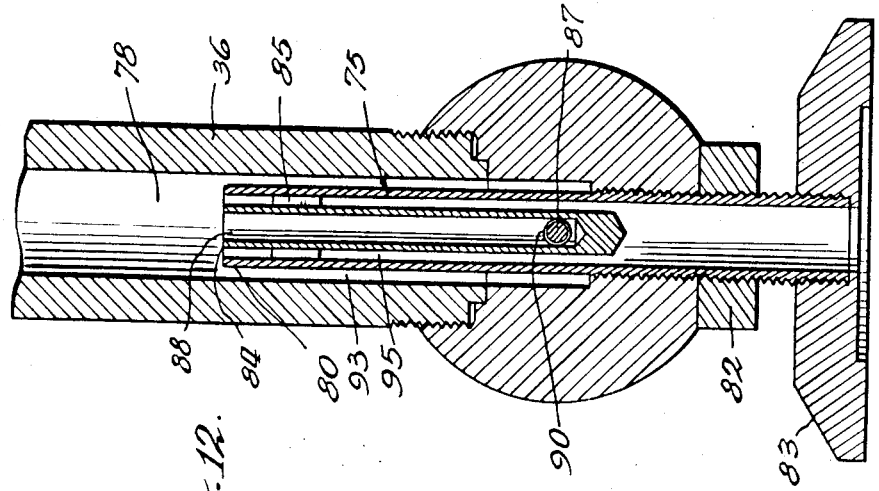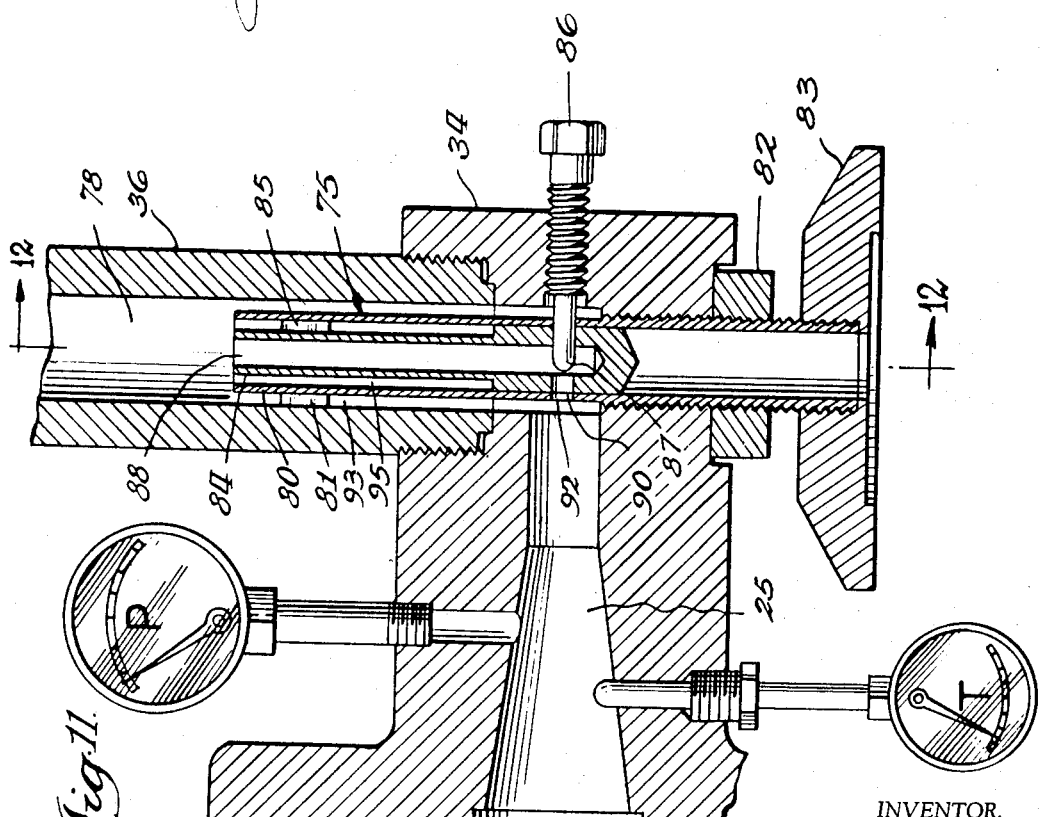

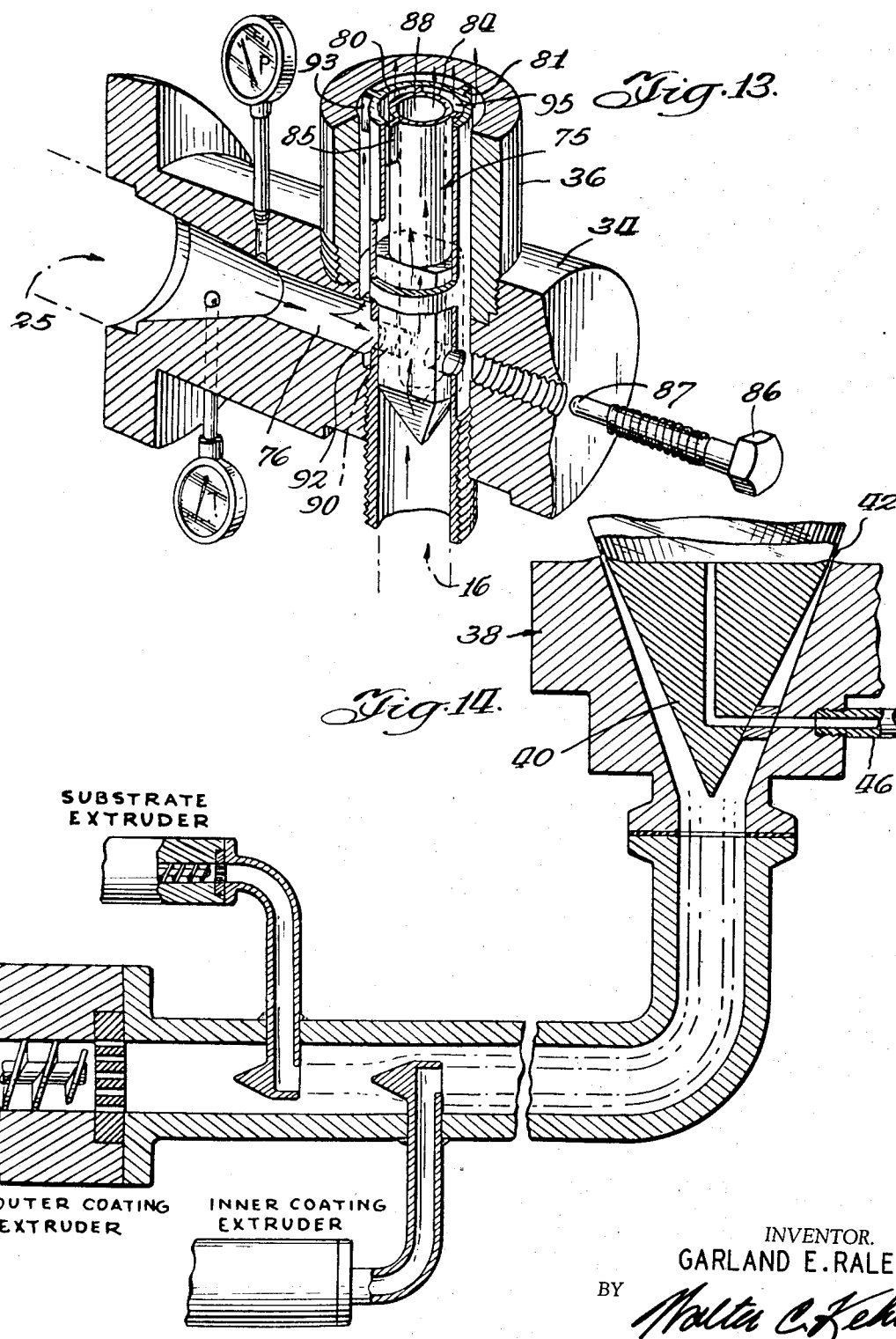

United States Patent Office 3,354,506
Patented Nov. 28, 1967

3,354,506
APPARATUS FOR MELT EXTRUSION OF
MULTI-WALL PLASTIC TUBING
Garland E. Raley, Morris Plains, N.J., assignor to
Union Carbide Corporation, a corporation of New
York
Original application Apr. 30, 1962, Ser. No. 191,230, now
Patent No. 3,223,761, dated Dec. 14, 1965. Divided and
this application Nov 16, 1965, Ser. No. 508,065
2 Claims. (Cl. 18—14)

ABSTRACT OF THE DISCLOSURE

A multi-walled tubing is formed by extruding said tubing from an apparatus designed to form an inner melt core of one thermoplastic fed from one extruder while simultaneously forming interior and exterior layers of a different thermoplastic about the inner core.

This application is a division of United States patent application Ser. No. 191,230, filed Apr. 30, 1962 now United States Patent Number 3,223,761.

This invention relates to apparatus for the simultaneous melt extrusion of a plurality of thermoplastic materials to form tubing having a multi-wall structure.

More particularly, the invention is concerned with certain apparatus for the production of multi-wall, tubular thermoplastic film by coaxially melt-extruding two or more different thermoplastic compositions into tubing, internally inflating the tubing as it is extruded and while it is yet in the formative plastic state, to a predetermined larger diameter and then circumferentially chilling the tubing at a point where it has obtained the desired inflated diameter to cool the tubing to a temperature at which it is resistant to a further expansion by the internal inflating pressure.

An object of this invention is to provide an apparatus for continuously, coaxially melt-extruding a plurality of different thermoplastic materials into integral, multi-wall tubing of uniform, predetermined thickness in each wall of said tubing.

Another object of this invention is to provide apparatus for concurrently melt-extruding a plurality of thermoplastic materials into continuous multi-wall tubing, each thermoplastic material forming at least one wall in said tubing.

The term "thermoplastic material" as used herein is inclusive of all melt-extrudable thermoplastic polymers and compositions containing such polymers in admixture with fillers, pigments, dyes, antioxidants and other additives such as anti-blocking agents, anti-static agents and others ordinarily employed to modify the characteristics of the polymer.

The several walls of the multi-wall tubing produced according to this invention can all contain the same thermoplastic ploymer, but which walls differ from each other as for example by the inclusion of a coloring agent in the polymer constituting the inner wall of the tubing, and with the outer wall being clear having been formed by the same polymer free from any coloring agent. Moreover, the present invention includes the production of multi-wall tubing wherein all the walls are made of polymers of the same genus, but one wall can be of a low average molecular weight polymer or a low crystalline content polymer and the other wall of a considerable higher average molecular weight polymer or a high crystalline content polymer depending on the properties desired in the multi-wall tubing.

Other and additional objects will become apparent as the description continues.

In general, the objects of this invention are accomplished by separately heating each thermoplastic material which is ultimately to form an individual distinct wall or layer in the composite tubing to its melt extrusion temperature, as for example by a conventional melt extruder, each extruder separately pressure feeding a stream of its melted thermoplastic material into an extended cylindrical chamber, the discharge end portion of said chamber communicating with an annular die orifice, the melted material for forming the outer wall of the tubing being fed into said chamber and passed therethrough as a continuous annular stream contacting the interior wall of the chamber, the melted materials for forming additional walls between said outer wall and the interior wall of the final tubing, also being fed to said chamber and passed therethrough as annular coaxial streams concentric with and interior to said outer wall annular stream, and the thermoplastic material for forming the innermost wall of said tubing being pressure fed to said chamber and passed therethrough as a central core completely filling the remaining space in said chamber, to form a solid stream of melted plastic materials, the plastic melt flow of said materials through the chamber having Reynolds numbers below the threshold of turbulence (Nre–2100), discharging the composite, concentric cylindrical solid stream of plastic material centrally into an annular die assembly having a mandrel axially piercing and radially distributing said cylindrical stream into a tubular stream, and then extruding the pierced stream through the die lips to form continuous seamless tubing.

Surprisingly, it has been found that in the practice of this invention the molten masses of unlike thermoplastic resins or thermoplastic compositions can be conjoined as annuli enveloping a central cylindrical mass of molten plastic in a chamber which is in spaced relationship to an annular extrusion orifice, and therebetween the conjoined cylindrical plastic mass is advanced, radially distributed into a tubular stream which can be attenuated and extruded without changing relative proportions of the diverse plastic constituents in the cylindrical molten plastic mass or intermixing of the various plastic materials. By this method, for example, a thermoplastic film material having physical characteristics such as a desirable high modulus of elasticity, but poor optical quality e.g., lacking in clarity, or having an undesirable narrow heat-seal temperature range can be extruded with a thermoplastic film material having a broad heat-seal temperature range, or that has superior optical properties to form multi-wall tubing wherein the outer and/or inner wall is formed from the broad heat-seal range polymer and a concentric middle lamina in the tubing is formed from the polymer having a high modulus of elasticity. The amount of each polymer in a given wall of the tubing can be exactly proportioned by regulating independently the plastic feed delivery of a plurality of extruders to the chamber wherein the separate streams are coaxially distributed and feeding the conjoined plastic mass to and through the extrusion die orifice.

An important feature of this invention resulting in the uniform coaxial distribution into annuli of the diverse plastic materials fed into the elongate chamber, each annulus containing only one plastic material, is the maintaining of the melt flow of these materials below the threshold of turbulent flow whereby substantially laminar flow conditions prevail within the chamber and to and through the die orifice.

Another important feature of this invention is the pressure feeding of the coaxial cylindrical mass of molten materials whereby each individual annulus in the coaxial melted plastic mass is subjected to continuous heat and pressure until it passes through the die orifice. Inasmuch as all the diverse plastic materials in the coxial mass are in a melted condition while concurrently being under pressure of the order of 500 to 3500 pounds per square inch or higher, developed by the continuous feeding to the chamber of melted plastic from the several extruders, optimum bonding conditions are present for securing tenacious bonding together of each annulus of plastic material to its adjacent annulus of different plastic material.

It is to be noted that the exposure to heat and pressure of the diverse plastic materials in the molten coaxial stream is maintained for a considerable period of time as the coaxial stream slowly flows towards the die orifice. In other procedures heretofore proposed for continuously heat and pressure laminating together films of dissimilar plastic materials, it has not been commercially feasible to simultaneously heat all the films to a molten condition, and still maintain their physical dimensions and not flow unduly when subjected to bonding pressure. In general, such previously proposed procedures depended upon heating one of the plastic films to an elevated temperature but below that at which it was no longer self-supporting and passing the heated film and unheated different film between counter rotating rollers, the two films being only momentarily subjected to pressure as they passed through the nip of the rollers, the resultant laminate having generally a poor bond strength between the adjacent films.

In the accompanying drawings, there is shown several embodiments of extrusion apparatus effective for forming multi-wall thermoplastic tubing according to this invention and wherein:

FIGURE 1 is a diagrammatic side elevation of an extrusion apparatus for forming coaxially melt-extruded, multi-wall thermoplastic tubular film.

FIGURE 2 is a diagrammatic fragmentary section of the apparatus generally shown in FIGURE 1 and illustrating the cylindrical chamber in which the plastic stream from each extruder is molded into coaxial streams.

FIGURE 3 is a sectional view taken along the line 3—3 of FIGURE 2.

FIGURE 4 is a sectional view taken along the line 4—4 of FIGURE 2.

FIGURE 5 is a sectional view taken along the line 5—5 of FIGURE 2.

FIGURE 6 is a sectional view taken along the line 6—6 of FIGURE 2.

FIGURE 7 is a sectional view taken along the line 7—7 of FIGURE 2.

FIGURE 8 is a sectional view taken along the line 8—8 of FIGURE 2.

FIGURE 9 is a sectional view taken along the line 9—9 of FIGURE 2.

FIGURE 10 is a sectional view taken along the line 10—10 of FIGURE 2.

FIGURE 11 is a vertical sectional view of an annulus forming chamber.

FIGURE 12 is a sectional view taken along line 12—12 of FIGURE 11.

FIGURE 13 is a somewhat enlarged perspective view, partially broken away, of the plastic flow control metering valve and coaxial stream forming means shown in FIGURE 2, and, FIGURE 14 is a diagrammatic side elevation of a melt extruding apparatus for forming a triple wall tubular film.

Referring now to FIGURES 1 to 13 wherein like reference numerals designate like parts, a primary thermoplastic resin extruder generally indicated by the reference numeral 10 is used to feed a melt flow 16 of thermoplastic resin that ultimately constitutes the middle layer or substrate of a triple wall tubular film structure 30. Extruder 10 has a feed hopper 12 for receiving thermoplastic resin pellets, a screw chamber 13 and screw 14 for compacting, melting, mixing and advancing the resin to and through a perforate breaker plate 18. The extruder 10 has a jacketed chamber 19 supplied with heated oil or other suitable fluid for heating the thermoplastic resin as it is advanced from hopper 12 to the discharge conduit of the extruder.

A secondary thermoplastic resin extruder generally indicated by the reference numeral 20 is used to feed a melt flow 25 of thermoplastic resin that constitutes the supply for an inner coaxial wall forming flow 26 and an outer coaxial wall forming flow 27 of the laminated triple wall tubular film structure 30. Extruder 20 has a feed hopper 22 for receiving thermoplastic resin pellets, a screw chamber 23 and screw 24 for compacting, melting, mixing and advancing the melted resin to and through a perforate breaker plate 28. The extruder 20 has a jacketed chamber 29 supplied with heated oil for melting the resin supply as it is advanced from hopper 22 to the discharge conduit of the extruder. Each extruder has a gauge P for measuring the pressure of the melted plastic and a thermometer T for measuring the temperature of the plastic.

The plastic melt flow from extruder 10 is discharged therefrom through its tapered discharge conduit to an elbow 32 connected to a port of triple ported T fitting 34, another port being connected to the discharge end of extruder 20 and the third port being connected to a vertical die holder 36 having a cylindrical central passage 78 therethrough.

A multi-ported torpedo assembly 75 for channeling the flow of melted plastic from extruder 10 into an annular stream 16, and of melted plastic from extruder 20 conjointly into an annular stream 27 exteriorly encircling annular stream 16 and a solid circular stream 26 interiorly of annular stream 16 is positioned within the lower portion of central passage 78 in die holder 36 and extends downwardly through T fitting 34.

Torpedo assembly 75 as more particularly shown in FIGURES 2 to 9, and 11 to 13 comprises a cylindrical metal tube 80 having its lower end threadably engaged in the bottom port of T fitting 34 and a flange 83 mating with the flanged section of elbow 32 on extruder 10. A lock nut 82 secures tube 80 to T fitting 34.

Cylindrical tube 80 has, an integrally attached extensions to its outer surface and adjacent its upper end, three equidistant spaced streamlined spiders 81 to center the tube in passage 78.

Concentrically positioned within tube 80 and fastened thereto as by welding, is an inner tube 84 having an extensions to its outer surface, and adjacent its upper end, three equidistant spaced streamlined spiders 85 to center tube 84 interiorly to tube 80, and has on its lower end a proportioning chamber. Tube 84 has a central cylindrical passage 88 and a communicating transverse passage 90 and is press fitted interiorly into assembly with tube 80 so that passage 90 of the proportioning chamber is aligned with passage 92 of tube 80 and also with central passage 76 of T fitting 34. The molten plastic 25 flows from secondary extruder 20 toward the proportioning chamber and is divided at the entrance to cojoined passages 92 and 90 thereof, a portion of the molten plastic coating flow rising as an annulus in the passage 93 formed by the outer surface of tube 80 and the inner wall of passage 78, and the balance of the flow rising as a cylinder in passage 88. An adjustment valve stem 86 is threadably fastened into the outboard end of T fitting 34 and mounted central to passage 90. The threaded adjustment advances or retracts the rounded end 87 of valve stem 86 and by restricting or enlarging the effective opening of passage 90 thereby proportions the relative amount of solid circular plastic stream flow 26 with respect to outer wall-forming plastic flow 27 passing upwardly through annular passage 93.

The proportioning chamber at the lower end of tube 84 has its lower end outer walls flattened on two sides parallel to each other and to passage 90 and its lower extremity streamlined to form a truncated wedge which fibrucates and guides the plastic fed thereto from extruder 10 about the proportioning chamber. Referring to FIGURES 4, 5, 6 and 12, the passage 95 formed by the flattened outer walls of 84 and the inner wall of tube 80 guides the two streams 16′, 16″ about the proportioning chamber and reunites them in combined flow rising as an annulus in the upper extension of passage 95 formed by the outer surface of tube 84 and the inner surface of tube 80.

As will be noted by reference to FIGURE 3 which is a section adjacent flange 83, the plastic melt flow 16 is in the form of a solid stream prior to contacting the flattened lower end walls of tube 84. Upon contacting the flattened end wall the plastic melt flow 16 as shown in FIGURE 4 is bifurcated into two streams 16′ and 16″.

As shown in FIGURES 5 and 6, streams 16′ and 16″ are maintained separate from individual plastic melt flows 26 and 27 as they flow upwardly and by the proportioning valve means 87, 90.

As shown by FIGURE 7, the coaxial plastic melt streams 27 and 16 are each parted into three sectors by spiders 81 and 85 respectively, while plastic melt stream 26 continues its flow as a solid cylindrical stream. Upon emerging from the spider section of torpedo assembly 75, the three sectors of melt stream 27 again unite as the outermost coaxial stream, the three sectors of melt stream 16 also unite as the middle coaxial stream and solid melt stream 26 forms the inner core of a composite coaxial solid stream as shown in cross-section by FIGURE 8. This solid stream is maintained under intense hydraulic pressure as it is moved upwardly in cylindrical passage 78 to an annular die assembly generally indicated at 38, and thereby produces a strong bonding effect between the interfaces of the several coaxial streams.

The annular die assembly comprises a conical die cup 41 and a depending cone 40 spaced therefrom to form a tapered annular passage 37 for supplying thermoplastic material from cylindrical passage 78 to an annular die orifice 42. The bottom portion of die assembly 38 has a flanged base mating with a flanged end portion of die holder 36, and is fastened thereto by bolts not shown. Although a tapered passage 37 is illustrated in the drawings, a passage formed between parallel walls can be used successfully. Moreover, the depending cone need not terminate in a sharp tip but can be made as a right truncated cone having a plane circular face. Alternatively, there can be used a right cylindrical core piece instead of the cone 40.

The composite solid stream of coaxially distributed melted plastic materials as shown in FIGURE 8 is radially pierced by the tip of cone 40 and is diverged outwardly thereby into passage 37, still maintaining, however, the sharp interfacial coaxial relationship of the several plastic streams as shown in FIGURE 9 and which continues as the conjoint melted streams are extruded through annular die orifice 42 to form the triple-wall tubing 30 whose cross-section is shown by FIGURE 10.

The tubing 30 emerges from the die orifice 42 in a hot formative plastic state enabling it to be radially distended and its wall thickness attenuated by the inflating pressure of a gaseous medium such as air or other suitable gas introduced into the interior thereof from an orifice 44 in cone 40. Air under controlled pressure is supplied to orifice 44 by its connection to a supply line 46.

The inflated tubing 30 is drawn upwardly by a pair of driven counter-rotating squeeze rolls 48 and 50 disposed in spaced relationship to the die. The tubing 30, as it is drawn from the die, passes interiorly through a rotating ring 52 which applies a cooling gaseous medium in the form of an annular stream onto the peripheral wall of the tubing to chill the plastic to a set condition. The rotating ring 52 is rotatably mounted on annular cylindrical housing 54 to which the gaseous cooling medium is supplied by a plurality of blowers 56 (only one of which is shown). Rotating ring 54 is formed with a pulley surface that cooperates with continuous belt 58 driven by a speed reducer-motor combination unit generally indicated by 60. The die 38 and air ring housing 54 are mounted on cross-members 62 of the machine frame generally indicated by 64. The rotating air ring herein described is of the type described and contemplated by R. F. Pierce in U.S. Patent No. 2,632,206.

Squeeze roll 48 has a shaft extension at each end to mount rotatably in bearings 66 mounted on frame cross-members 68; and squeeze roll 50 has a shaft extension at each end to mount rotatably in bearings 70 also mounted on frame cross-members 68.

The rolls 48 and 50 in addition to confining the inflating air in the tubing 30 also serve to collapse the tubing passing therebetween into a flattened, ribbon-like material, designated by the reference number 72 which is wound up on a windup reel driven by a torque motor, not shown, and guided thereto by guide rolls 74.

In the embodiment of the invention for coaxial extrusion of thermoplastic tubing by the multiple extruder apparatus illustrated in FIGURES 1 to 13, it is economically desirable to employ a startup procedure that quickly stabilizes continuous production of the tubing of predetermined diameter and wall thickness and wherein the constituent lamina or individual wall thicknesses are proportioned to a predetermined ratio. As a general rule, the first plastic material to be melted, pressurized and fed therethrough to the die orifice 42 should be that material forming the outer wall of the composite tubing. Thereafter, upon attaining a steady flow of this plastic material, the extruder supplying desired plastic material for the inner and outer walls is operated to supply melted material to the die orifice. For optimum efficiency in the startup of the apparatus of FIGURES 1 to 13 to extrude triple wall tubular film having a middle wall of one material and inner and outer walls of a different plastic material than the middle wall, the following steps are taken:

(A) Both extruders 10, 20 are placed in operation with valve 87 being in an open position, and each extruder supplying during this interim that melted resin which subsequently forms the interior and exterior walls of tubing 30 resulting in tubing having the same resin throughout its thickness.

(B) The screw of extruder 20 is temporarily stopped and thus ceases to feed melted plastic material to the die orifice.

(C) Throughput (at the die orifice) from extruder 10 discharging melted resin, is adjusted to produce tubular film having a wall thickness corresponding to that desired in the middle film wall 16 of tubing 30.

(D) With extruder 10 continuing to operate under the conditions established in step C, extruder 20 is restarted and its feed rate adjusted to supply an amount of resin such that the resultant film has the total wall thickness desired in tubing 30. During this step, valve 87 is so adjusted to furnish a desired thickness in the outside wall 27 and a desired thickness in the inner wall 26.

(E) Upon attaining desired wall thickness, the resin supply for extruder 10 is changed to a resin having the particular properties desired for middle wall 16, thereby purging the passage system connected to extruder 10 of the resin first extruded therefrom and establishing an annulus of the desired middle wall resin in the stream of melted plastic materials advancing to the die orifice.

In general, the walls of the die mandrel 40 are more readily purged of an undesired resin melt than are the walls of the die cup 41 and accordingly the foregoing procedure facilitates rapid purging of the extrusion system whereby each wall of the triple wall tubing is constituted solely of desired plastic material.

The details and manner of practicing the invention are apparent in the following specific examples, it being understood, however, that they are merely illustrative embodiments of the invention and that the scope of the invention is not restricted thereto.

It will be noted that in all of the subsequent examples the apparatus which was actually used to form the multi-wall thermoplastic tubing corresponded essentially to that shown in FIGURES 1 to 13 of the drawing. As will be described in these examples, the apparatus can be readily operated to form a dual wall plastic tubing as in Example 1, triple wall tubing as in Examples II, III, IV and V, or single wall tubings as in the instance for the controls of Examples III and IV.

*Example I*

A dual wall self-supporting tubular polyethylene film averaging 3.5 mils in thickness, one wall being a black pigmented polyethylene and the other wall a white pigmented polyethylene, was prepared by melt-extruding a black polyethylene composition comprising 3.5 parts by weight of carbon black and 96.5 parts by weight of a film grade polyethylene having a melt index value of 2.0 (ATSM test D–1238–52T) and a density of 0.92 through extruder 10 and concurrently melt-extruding from extruder 20 a white polyethylene composition comprising 5.0 parts titanium dioxide and 95 parts of the same polyethylene as in the black composition. During the extrusion, proportioning valve 87 was closed to prevent any flow of the white polyethylene composition through passage 88. The extrusion conditions of pressure, temperature and die orifice 42 dimensions for this example and all the others are set forth in subsequent Table I which also includes data on the physical properties of the multi-wall extruded film. The resultant dual wall tubular film was opaque, the interior wall being wholly black in color and the exterior wall being completely white with no visible strike-through of black material. The tubular film slitted into flat sheeting had utility due to its opaqueness as a self-supporting wrapping material for photographic film, and as window shade material, the white side being aesthetically desirable and the other black side desirable for room-darkening purposes. No delamination of the two layers occurred when the film was repeatedly flexed.

*Example II*

A triple wall tubular self-supporting film was formed by melt-extruding from extruder 10, a film grade polyethylene having a melt index of 5 and a density of 0.960 to form the middle wall of the tubing, while concurrently melt-extruding from extruder 20 a film grade polyethylene having a melt index of 2.3 and a density of 0.923 to form the inner wall and outer wall of the tubing. In this instance, the proportioning valve 87 was fully opened to provide an inner wall thickness equal to the outer wall thickness. The resultant triple wall tubing was useful as a heat-sealable packaging film. It had more stiffness than a film of the same thickness made wholly from the 0.923 density polyethylene, such stiffness being desirable for use in packaging machinery requiring a stiff material for consistent feeding and manipulation therein. Additionally, inasmuch as each side of the film was provided with a surface of the lower density polyethylene it could be heat-sealed satisfactorily over a broader range of sealing temperatures, pressures and contact times than film made wholly from the higher density polyethylene.

*Example III*

Polyethylene in the higher density range, e.g., 0.935 and higher generally yield, self-supporting films having poor optical properties such as greater haze than films of lower density polyethylene when extruded by the blown tube, air-cooled process such as is described by Fuller in U.S. Patent No. 2,632,206. It has now been found that the optical properties of such high density polyethylene can be substantially improved by sandwiching such polymers as the middle wall in a triple wall tubing between an outer wall and an inner wall, each of a polyethylene having a density of up to about 0.925. A triple wall, self-supporting, clear polyethylene film was continuously produced by melt-extruding from extruder 10, a film grade polyethylene having a melt index of 1.5 and a density of 0.937 to form the middle wall of the tubing and concurrently melt-extruding from extruder 20 a film grade polyethylene having a density of 0.923 and a melt index of 2.3. The several walls of the resultant triple wall film were firmly bonded together and did not delaminate when repeatedly manually flexed. Moreover, the triple wall film had a higher gloss and clarity than a single wall film of the same total thickness prepared by melt extruding tubular film from the apparatus using only extruder 10 to supply the polyethylene of 0.937 density. The triple wall film was useful as a heat-sealable packaging film for wrapping bread and other food stuffs.

*Example IV*

Self-supporting film grade polypropylenes, as do the higher density polyethylenes, yield tubular film of poor optical properties when made by the blown tube process described by Fuller in U.S. Patent 2,461,975. Moreover, polypropylene films are more difficult to heat-seal due to their relatively sharp melting points. According to the process of this invention, these deficiencies are substantially overcome by sandwiching the polypropylene as a middle wall between an inner wall and outer wall of a polyethylene having a density of up to about 0.925 in a triple wall tubular film construction. Thus, a polypropylene-containing triple wall tubular film of improved clarity and heat-sealability was produced by melt-extruding from extruder 10, a film grade polypropylene having a density of 0.91 and a melt index of 5.0 and concurrently melt extruding from extruder 20 a film grade polyethylene having a melt index of 2.3 and a density of 0.923 to form the inner and outer walls of the resultant triple wall tubing. This tubing had significantly better optical properties than a control melt-extruded tubular film of identical total film wall thickness containing only the aforedescribed polypropylene resin. The triple wall tubing was useful as a packaging film for bread and other food stuffs.

*Example V*

Self-supporting items of polyamides such as nylon-6 are useful as packaging films requiring greaseproofness and abrasion resistance. Such films composed solely of nylon-6 polymer are presently more costly than polyethylene films which, however, have less resistance to grease and fats. It has now been found that such polymers can be advantageously combined as in a dual wall tubular film wherein one of the walls is composed solely of nylon-6 polymer and other wall of polyethylene. Typically, a dual wall tubing was prepared by melt-extruding from extruder 20 a film grade polyethylene having a density of 0.920 to form the outer wall. In this instance proportioning valve means 87, 90 was closed. The resultant dual wall tubular film was useful as a packaging material in applications where the fatty material or grease was in direct contact with the nylon-6 wall surface. The bond strength of the nylon wall to the polyethylene wall was such that after limited manual flexing of the film, the polyethylene film could be peeled off the nylon surface.

It is to be understood that the invention is not restricted to the ploymers specifically exemplified in the examples supra. In general, the invention can be utilized with any melt-extrudable thermoplsatic material, including mixtures of such thermoplastics and synthetic rubbers. Illustrative of other suitable thermoplastic polymers are polystyrene, copolymers of styrene with other polymerizable monomers as for example styreneacrylonitrile copolymers, fluorocarbon polymers such as polytrifluorochlorethylene, polycarbonates, polyethylene oxides, polyvinyl alcohol, cellulose acetate, cellulose butyrate, cellulose propionate, acrylate and methacrylate homopolymers and copolymers, linear polyesters as for example polyethylene terephthalate, polyvinyl chloride rigid or plasticized, copolymers of vinyl chloride as for example vinyl chloride-vinyl acetate copolymers and vinyl chloride-vinylidene chloride copolymers. Moreover, the properties of these thermoplastic polymers, as is well known, can be modified by the incorporation therein of suitable modifying agents, such as plasticizers, fillers, coloring agents, antioxidants, heat and light stabilizers, destaticizers and other.

In the several examples, the invention was exemplified by the production of multi-wall tubular film of varying total wall thickness. Such tubing can be made by this invention to a total wall thickness as low as 0.0004. Maximum wall thickness is primarily determined by the end use requirements of the tubing and hence can, if desired, be of the order 0.030 inch, 0.050 inch, 0.10 inch or even higher. Expansion of the tubing by inflating internal air pressure is a desirable technique for producing thin-wall tubular film, however, the extruded tubing need not necessarily be expanded in those instances where the as is extruded wall thickness is satisfactory for the intended use of the tubing.

The degree of bond strength between the several walls of a multi-wall tubing produced according to this invention, is primarily dependent on the degree of compatibility or incompatibility of the polymer in a given wall with respect to the polymer in an immediately adjacent wall. For example, the highest values in bond strength are obtained in wall combinations of similar polymers as for example between a wall of low density polyethylene and a wall of medium density polyethylene. A lesser degree of bond strength is exhibited between a wall of polyethylene and a wall of polypropylene. Radically different polymers have generally the lowest bond strength to each other as for example a multi-wall structure of polyethylene and nylon-6 as shown in Example 5. Another example of still lower bond strength is that of a multi-wall tubular film in which a wall of polyethylene is adjacent to a wall of polyethylene terephthalate, such tubing can usually be delaminated if desired by applying a peeling force insufficient to tear the individual walls, whereas in the instance of nylon and polyethylene, the somewhat higher degree of adhesion can cause tearing of one or both walls during peeling of one wall off the other wall.

if desired. For example, a triple wall extruded tubular structure having a different polymer in each wall can be readily produced by the apparatus illustrated in FIGURE 14, wherein each of the three extruders is supplied with a different polymer for coaxial feeding into a single common passage terminating in an annular single cavity die assembly. If more than three walls are desired, the apparatus illustrated in FIGURE 14 can be modified by the addition of the required number of extruders to supply melted plastic material for the additional walls.

As it is obvious that various changes and modifications may be made in the above description without departing from the nature or spirit thereof, this invention is not restricted thereto, except as set forth in the appended claims.

What is claimed is:

1. Apparatus for melt-extruding multi-wall thermoplastic tubing comprising a single cavity annular die assembly, a body having a cylindrical chamber therein with one end of said chamber terminating at the entrant portion of said die assembly, a plurality of extruders, a passage means between each extruder and said cylindrical chamber for passage of melted plastic material from the extruder to the chamber, each passage means discharging plastic material into the chamber at a point spaced from the chamber's die terminating end, means in said chamber for forming therein from all the melted plastic materials supplied thereto a central cylindrical core of one plastic material about which are coaxially formed cylinders of other plastic materials to form a solid laminate stream of said plastic materials and means associated with said die assembly for axially piercing and radially distributing the core containing solid stream into a tubular stream.

2. Apparatus for melt-extruding multi-wall thermoplastic tubing comprising a single cavity annular die assembly, a body having a cylindrical chamber therein with one end of said chamber terminating at the entrant portion of the die assembly, a first extruder and a second extruder, a passage means between each extruder and said cylindrical chamber for flow of melted plastic from its extruder to the chamber, each passage means discharging plastic material into the chamber at a point spaced from

TABLE I

| Example No. | I | II | (III) Control | III | (IV) Control | IV | V |
|---|---|---|---|---|---|---|---|
| Extruder (10): | | | | | | | |
| Barrel Dia., in | 2½ | 2½ | 2½ | 2½ | 2½ | 2½ | 3½ |
| Screw (14), r.p.m | | 14 | 70 | 85 | 51 | 35 | 15 |
| Barrel Temp., °F | 375 | 400 | 400 | 400 | 400 | 400 | 500 |
| Plastic Melt Temp., °F | 365 | 390 | 390 | 390 | 390 | 395 | 480 |
| Plastic Melt Press., p.s.i. | 2,100 | 1,500 | 2,500 | 2,600 | 1,900 | 1,600 | 4,400 |
| Extruder (20): | | | | | | | |
| Barrel Dia., in | 1½ | 1½ | 1½ | 1½ | 1½ | 1½ | 1½ |
| Screw (24), r.p.m | | 21 | | 39 | | 45 | 38 |
| Barrel Temp., °F | 375 | 375 | | 400 | | 400 | 475 |
| Plastic Melt Temp., °F | 365 | 365 | | 392 | | 370 | 390 |
| Plastic Melt Press., p.s.i. | 600 | 600 | | 600 | | 600 | 3,000 |
| Tee-Fitting (34): Temp., °F | 375 | 400 | | 400 | 450 | 450 | 500 |
| Die (38): | | | | | | | |
| Temp., °F | 375 | 400 | 400 | 400 | 450 | 450 | 500 |
| Orfice (42) Dia., in | 6 | 6 | 12 | 12 | 6 | 6 | 6 |
| Orifice Width, in | .018 | .018 | .025 | .025 | .018 | .018 | .018 |
| Tubular Film (30): Diameter, in | 18 | 20 | 16½ | 16½ | 13½ | 13½ | 11½ |
| Wall Thickness (mils): | | | | | | | |
| Inner Wall (26) | | 0.44 | | 0.075 | | 0.312 | 0.75 |
| Middle Wall (16) | 1.75 | 0.12 | 1.00 | 0.85 | 1.25 | 0.625 | 1.50 |
| Outer Wall (27) | 1.75 | 0.44 | | 0.075 | | 0.312 | 0.75 |
| Physical Properties: | | | | | | | |
| Haze (A.S.T.M.-D-1003-59T) | | 7.5 | 5.5 | 3.2 | 45.8 | 10.1 | |
| Gloss: (45° Gardner Photometer) | | 75 | 64 | 78 | 14 | 58 | |
| Modulus at 1% Elongation: | | | | | | | |
| (1×10³ p.s.i.) MD | | 38 | 55 | 47 | 162 | 97 | |
| (A.S.T.M.-D-1530-58T) TD | | 41 | 60 | 48 | 160 | 84 | |

The number of walls in a given multi-wall tubular structure and the nature of the polymer in each is determined essentially by the use properties desired in the structure. Each wall can be formed of a different polymer, truder, a passage means between each extruder and said cylindrical chamber for flow of melted plastic from its extruder to the chamber, each passage means discharging plastic material into the chamber at a point spaced from the chamber's die entrant end, a torpedo positioned in said chamber having a central passageway therethrough one end of said passageway connecting with the passage means from the first extruder and the other end being positioned to discharge a central core of plastic material in said chamber, a first annular passageway in said torpedo one end thereof being connected to the passage means of the first extruder and other end being positioned to discharge an annular stream of melted plastic material contacting the inner chamber wall, a second annular passageway in said torpedo one end thereof being connected to the passage means of the second extruder and other end being positioned to discharge into the chamber a second annular stream of melted plastic material between the first annular stream and the core stream and form therewith a solid stream, and means associated with said die assembly for axially piercing and radially distributing the core containing solid stream into a tubular stream.

References Cited

UNITED STATES PATENTS

| | | |
|---|---|---|
| 1,978,163 | 10/1934 | Megow. |
| 2,328,998 | 9/1943 | Radford. |
| 2,576,444 | 11/1951 | Clinefelter _____ 18—13 XR |
| 2,592,658 | 4/1952 | Colombo _____ 18—14 |
| 2,632,206 | 3/1953 | Pierce _____ 18—14 XR |
| 2,716,778 | 9/1955 | Beare. |

FOREIGN PATENTS

| | | |
|---|---|---|
| 1,106,628 | 7/1955 | France. |
| 1,117,862 | 11/1961 | Germany. |

WILLIAM J. STEPHENSON, *Primary Examiner.*